United States Patent [19]

Bermudez et al.

[11] 4,411,927
[45] Oct. 25, 1983

[54] METHOD FOR GRINDING CEREAL GRAINS IN THE PRESENCE OF GRINDING AIDS

[75] Inventors: Mauricio Bermudez, Miami, Fla.; Richard R. Klimpel; Steven D. Sands, both of Midland, Mich.

[73] Assignee: The Dow Chemical Company, Midland, Mich.

[21] Appl. No.: 393,566

[22] Filed: Jun. 30, 1982

Related U.S. Application Data

[63] Continuation-in-part of Ser. No. 195,977, Oct. 10, 1980, abandoned, which is a continuation-in-part of Ser. No. 114,036, Jan. 21, 1980, abandoned.

[51] Int. Cl.$^3$ .............................................. A23L 1/00
[52] U.S. Cl. .................................. 426/618; 426/661; 426/518
[58] Field of Search ............... 426/618, 622, 455, 518, 426/661; 241/6–8, 15, 16; 536/56–58

[56] References Cited

U.S. PATENT DOCUMENTS

| | | | |
|---|---|---|---|
| 444,847 | 1/1891 | Pameroy | 241/6 |
| 2,413,472 | 12/1946 | Sullivan | 426/518 |
| 3,097,948 | 7/1963 | Ishikawa | 426/622 |
| 3,950,182 | 4/1976 | Steel et al. | 106/308 |

OTHER PUBLICATIONS

Kirk–Othmer, *Encyclopedia of Chemical Technology*, vol. 4, 2nd Edition, 1964, p. 613.

*Primary Examiner*—Raymond N. Jones
*Assistant Examiner*—Elizabeth A. Hatcher

[57] ABSTRACT

Cereal grains, particularly corn, are effectively ground in the presence of an aqueous grinding medium by employing a hydrophilic polysaccharide, e.g., a cellulose ether such as hydroxypropyl methylcellulose, as a grinding aid.

7 Claims, No Drawings

METHOD FOR GRINDING CEREAL GRAINS IN THE PRESENCE OF GRINDING AIDS

CROSS-REFERENCE TO RELATED APPLICATION

This application is a continuation-in-part of our copending application Ser. No. 195,977, filed Oct. 10, 1980, now abandoned which is a continuation-in-part of application Ser. No. 114,036, filed Jan. 21, 1980, now abandoned.

BACKGROUND OF THE INVENTION

This invention relates to a method for grinding cereal grains, particularly to methods wherein the cereal grain is ground in the presence of an aqueous grinding medium and a polysaccharide.

In the preparation of many food products from cereal grains, the cereal grain is often ground or milled to a suitable size in the presence of a liquid grinding medium, conventionally water or other aqueous liquid. For example, corn, which has previously been heated in an alkaline aqueous solution, e.g., calcium hydroxide solution, is often ground in a rotary shear type apparatus, e.g., hammer mill, to make a ready mix useful for preparing tortillas and other corn products.

In general, due to the inefficiencies inherent in shear type grinding operations, to obtain the desired particle size requires relatively long grinding times and outputs of significant amounts of energy. Moreover, as the kernels of grain are fractured during the grinding process, starches are released. These starches, when contacted with an aqueous grinding medium, form a sticky mass which slows the grinding process even further.

One method of increasing the efficiency of the grinding operation is to reduce the moisture content of the grain prior to grinding. Unfortunately, however, such a method requires significant additional processing time and equipment costs and greatly slows the overall milling operation. Moreover, the dried flour prepared in this manner has a low moisture content, which deleteriously affects the properties of doughs and products prepared therefrom.

Grinding aids, e.g., silicates, phosphonates and sulfonates have been found useful in increasing the efficiency of the impact grinding of inorganic ores and fossilized mineral ores, but such grinding aids have not generally been found to effectively improve the grinding of the more plastic (i.e., easily deformed) cereal grains. Specifically, relatively large amounts of such conventional grinding aids are generally required to obtain the desired grinding efficiency. In addition, such grinding aids often deleteriously affect the subsequent processing of the ground material and are not generally approved for food usage. Therefore, they must normally be separated from the ground cereal grain following grinding.

In view of the aforementioned problems associated with the prior art, it would be highly desirable to improve the efficiency of the grinding of cereal grains.

SUMMARY OF THE INVENTION

Accordingly, the present invention in one aspect is a process for grinding cereal grains, said process comprising grinding the cereal grain in the presence of an aqueous grinding medium and an amount of a hydrophilic polysaccharide sufficient to increase grinding efficiency.

In the novel method of this invention, the grinding efficiency, as generally evidenced by a reduction in the number average particle size of the cereal grain after grinding the grain for a predetermined length of time, or alternatively by a decrease in the energy required in the grinding process, is measurably increased by grinding in the presence of a hydrophilic polysaccharide. As a result of this increased efficiency, cereal grains can generally be ground to a desired particle size at higher feed rates or a smaller size particle can be produced at a fixed feed rate. Moreover, the hydrophilic polysaccharides do not adversely affect subsequent process steps, e.g., filtration, of the ground cereal grain.

In a preferred embodiment of this invention, the cereal grain is ground in the presence of a hydrophilic polysaccharide which polysaccharide can suitably be employed in food products thereby eliminating the need to separate the polysaccharide grinding aid from the ground cereal grain. In another aspect, this invention is a ground cereal grain which is ground according to the method of this invention. The ground cereal grains of this invention contain the hydrophilic polysaccharide grinding aid and exhibit improved moisture retention and extrudability as a dough as compared to conventionally prepared flours. In addition, food products prepared with the ground cereal grains of this invention, i.e., tortillas and the like, exhibit less brittleness than food products prepared from conventional flours. In general, the food products prepared from such ground cereal grains will possess more desirable properties, e.g., increased moisture retention which results in improved workability, than food products ground using no polysaccharide.

The method of this invention is useful for grinding cereal grains, with the resulting ground cereal grains being useful in the preparation of a wide variety of food products.

DETAILED DESCRIPTION OF THE INVENTION

The term "cereal grain" is used conventionally herein and refers generally to the edible grain of members of the grass family. Representative examples of cereals having such edible grain are wheat, e.g., hard red spring or winter wheat, durum wheat, white wheat and mixed wheat; barley; corn, e.g., yellow, white or mixed corn of the dent or flint type; oats; rice; rye; sorghum; and the like. Cereal grains preferred in the practice of this invention are corn and wheat; with corn, particularly a mixture of white corn and yellow corn, being most preferred.

In the practice of this invention, the cereal grain is ground in the presence of an aqueous liquid (hereinafter referred to as an aqueous grinding medium). The aqueous grinding medium can be water (including aqueous liquids such as alkaline or acidic aqueous solutions, e.g., an aqueous solution of calcium or sodium hydroxide, or aqueous salt solutions) or a mixture of water and a water miscible liquid, preferably a polar liquid such as a lower alkanol, e.g., methanol, ethanol or propanol; a lower ketone, e.g., acetone or methylethyl ketone; an ether, e.g., diethyl ether or diethylene glycol methyl ether; and the like. Water is the preferred aqueous grinding medium.

The amount of the aqueous grinding medium employed in the practice of the present invention can vary within wide limits depending on the grinding techniques, the cereal grain and the desired particle size of the ground cereal grain. In general, the aqueous grinding medium is employed in amounts ranging from about 10 to about 100 weight percent based on the weight of the cereal grain and aqueous grinding medium wherein the weight of the cereal grain is a dry weight following removal of essentially all the water (moisture) therefrom, e.g., vacuum drying the cereal grain for 0.5 hour at 100° C. under a vacuum of 710 mm. Advantageously, the amount of the aqueous grinding medium is from about 20 to about 80, more advantageously from about 25 to about 60, weight percent based on the weight of the cereal grain and aqueous grinding medium. The method of this invention is particularly useful in the grinding of cereal grains, particularly corn, wherein the grain has been steeped or soaked in an aqueous liquid such as an alkaline aqueous solution, e.q., a calcium hydroxide solution. Optionally, the steeped grain is advantageously soaked, and/or rinsed with excess water prior to grinding. In such case, the aqueous grinding medium comprises that amount of liquid which remains following the filtration of the grain and excess liquid using a liquid permeable, grain impermeable screen, e.g., a screen having openings of about 1-2 mm.

As used herein, the term "hydrophilic polysaccharide" refers to polysaccharides, including derivatives thereof, which polysaccharides are capable of the sorption or the chemical or physical entrapment and retention of water. Polysaccharides which exhibit measurable water adsorption at 25° C. and 60 percent relative humidity using a conventional method for measuring equilibrium water adsorption such as described in the *Journal of Polymer Science*, Volume 22, published in 1956, "Pectic Substances-Water. I. Structural Changes in the Polygalacturonide Chains during Water Adsorption" by F. A. Bettelheim, C. Sterling and D. H. Volman, pages 303–314 are presumed to be hydrophilic for the purposes of this invention. Using such method, the polysaccharide advantageously adsorbs at least about 30, more advantageously at least about 50, mg of water per g of polysaccharide at 25° C. and a relative humidity of about 60 percent. In general, the sorption and/or entrapment and retention of water is evidenced by the polymer swelling or dissolving in an aqueous liquid and those polysaccharides which are soluble in an aqueous liquid are presumed hydrophilic for the purposes of this invention. Preferably, the polysaccharides employed herein are soluble in water in an amount of at least 1, more preferably at least about 5, weight percent based on the weight of the water and polysaccharide.

Representative hydrophilic polysaccharides useful herein are chemical modifications or derivatives of cellulose such as the cellulose ethers, e.g., alkyl or hydroxyalkyl cellulose derivatives including methylcellulose, hydroxypropyl methylcellulose, hydroxyethyl cellulose, ethyl methylcellulose and hydroxyethyl hydroxypropyl cellulose, and carboxymethylcellulose; natural gums such as arabic, tragacanth or karaya gum and natural gum derivatives such as hydroxypropylated guar gums; xanthan gum; modified starches such as hydroxypropyl starch; and the like. Of such polysaccharides, those preferably employed herein are the water-soluble cellulose ethers, particularly methylcellulose or methylcellulose derivatives such as hydroxypropyl methylcellulose and natural gums; with the hydroxypropylated cellulose ethers, e.g., hydroxypropyl methylcellulose and hydroxypropylated guar gum being more preferred.

Of the hereinbefore specified polysaccharides, those most preferably employed as grinding aids herein are suitably employed in food products, e.g., are approved by the FDA for food use. Of such materials, hydroxypropyl methylcellulose such as Methocel® K3, premium grade, and Methocel® K4M sold by The Dow Chemical Company; and guar gum derivatives are preferably employed herein, with hydroxypropyl methylcellulose and hydroxypropylated guar gum being more preferred. Hydroxypropyl methylcellulose is most preferably employed herein. Using such grinding aids, the ground cereal grain can be employed in the preparation of food products without the prior separation of the grinding aid therefrom. Moreover, the food products prepared from a mixture of the ground cereal grain and such polysaccharide grinding aids, particularly wherein the polysaccharide is a cellulose ether, particularly hydroxypropyl methylcellulose, often exhibit more desirable properties than food products prepared from a ground cereal grain having no such grinding aid therein. For example, corn ground in the presence of hydroxypropyl methylcellulose exhibits improved binding, i.e., less tendency to crack on cooking, and increased workability.

The hydrophilic polysaccharides are employed in an amount sufficient to increase the grinding efficiency of the cereal grain. In general, such increased grinding efficiency is evidenced by (1) the number average particle size of the cereal grain ground in the presence of an aqueous grinding medium and the hydrophilic polysaccharide using conventional grinding techniques, e.g., a rotary shear type apparatus such as a hammer mill, being measurably less than the number average particle size of a cereal grain ground using identical grinding techniques except no grinding aid is employed therewith, (2) a measurable reduction in the time required for grinding the cereal grain to a predetermined particle size and/or (3) a reduction in the amount of energy required to grind the cereal grain to a predetermined particle size at a predetermined rate. (See, for example, the test method set forth in Example 1.) Advantageously, the polysaccharide is employed in an amount such that the number average particle size of a cereal grain ground using the method of this invention is reduced by at least about 0.5, preferably at least about 1, percent when compared to an identical cereal grain ground using identical techniques but without the grinding aid. Such reductions in particle size represent significant improvements in the grinding efficiency.

Due to the increased grinding efficiency, the cereal grain can be ground to a desired particle size at higher feed rates or smaller size particles can be produced at a fixed feed rate using the improved method of the present invention. For example, in open cycle continuous grinding operations, increased throughput and/or reduced particle sizes at constant throughputs will be observed. Similarly, in continuous closed cycle grinding operations, wherein a portion of the cereal grain being ground is continuously recycled through the grinder until the desired size is obtained, the average residence time of the cereal grain to obtain a desired particle size will be measurably reduced. In addition, the power required to operate the mill is significantly reduced, often in an amount from about 3 to 15 percent.

The amount of the polysaccharide required to measurably improve the grinding efficiency of the cereal grain is dependent on a variety of factors including the grinding techniques, particularly, the amounts of water;

the type of the cereal grain and polysaccharide employed; and the desired increase in grinding efficiency. Typically, the polysaccharide grinding aid is employed at a concentration of at least about 0.05 weight percent based on the weight of the cereal grain and aqueous grinding medium. Advantageously, in the practice of this invention, the hydrophilic polysaccharide is employed in an amount from about 0.1 to about 10, preferably from about 0.2 to about 5, more preferably from about 0.5 to about 3, weight percent based on the weight of the cereal grain and aqueous grinding medium.

In the practice of this invention, the cereal grain, aqueous grinding medium and hydrophilic polysaccharide are mixed and the resulting mixture ground using conventional grinding techniques. While the method of combining, i.e., mixing, the grinding aid with the cereal grain is not critical, advantageously, the grinding aid is added to the mixture of the cereal grain and aqueous grinding medium prior to grinding. In continuous closed cycle grinding operations, the hydrophilic polysaccharide is advantageously added to the portion of ground grain being recycled through the grinder.

Grinding techniques useful herein are well known in the art and reference is made thereto for the purposes of this invention. In general, both shear type mills, e.g., hammer mills and knife grinders, and impact type mills such as tumbling media mills, e.g., ball mill or autogenous mills, can also be employed herein. The cereal grains are advantageously ground using a shear type mill, preferably a hammer mill or knife grinder; with a hammer mill being most preferred.

The ground cereal grain prepared according to the method of this invention contains the polysaccharide grinding aid, generally in an amount from about 0.05 to 10 weight percent based on the weight of the cereal grain and the aqueous grinding medium. When edible grinding aids are employed, the ground cereal grain is advantageously employed without removing the grinding aid therefrom. Said ground cereal grains containing the edible grinding aids exhibit improved moisture retention as compared to conventionally prepared cereal grains, i.e., the tendency of the cereal grains to lose water through evaporation or otherwise is reduced. Since rancidity in the cereal grain is promoted by low moisture content, increased water retention is a highly desirable property. In addition, doughs prepared from the ground cereal grains of this invention containing the edible grinding aid are more cohesive and are more readily extruded than doughs prepared from conventionally ground flour. Doughs prepared from grains ground according to the method of this invention can often be extruded at flow rates as much as 50 percent greater than the flow rates of flours prepared from conventionally ground flours. Food products prepared from the ground cereal grains of this invention containing the edible grinding aid also exhibit improved cohesiveness. In particular, tortillas prepared from the edible grinding aid-containing corn of this invention exhibit improved flexibility and decreased cracking, as compared to tortillas prepared from conventionally ground corn. Because of the aforementioned advantages of the cereal grains prepared according to this invention, the shelf life of both the doughs and baked products prepared therefrom are significantly increased.

The following examples are incorporated to illustrate the practice of this invention and should not be construed to limit its scope or application. In the example, all parts and percentages are by weight unless otherwise indicated.

EXAMPLE 1

A 135 part portion of white corn is cooked in an aqueous solution of 0.8 percent calcium hydroxide heated to boiling (approximately 98° C.) for a period of about 12 minutes. Similarly, a 57 part portion of yellow corn is cooked in an aqueous calcium hydroxide solution (0.8 percent) for 7 minutes. After cooking, the calcium hydroxide is drained from each corn portion. Each portion is subsequently rinsed with excess amounts of water and then soaked in water at ambient temperatures, i.e., between about 15° to about 25° C., for a 10 minute period. The rinse water is then drained from the corn. The portions of the resulting cooked, whole grain corn are mixed with the resulting mixture having a water content of about 40 percent which water serves as the aqueous grinding medium herein.

To a 100 part portion of the resulting water wet, cooked, whole grain corn is added 50 parts of a ground corn (70 percent white, 30 percent yellow with a water content of about 10 percent) having a particle size of from about 0.6 mm to about 2 mm and a number average particle size of about 1.2 mm and 1 part of a hydroxypropyl methylcellulose sold as Methocel ® K3 by The Dow Chemical Company. The resulting mixture of the water wet, cooked, whole grain corn; ground corn; and grinding aid is designated Sample No. 1.

A mixture (Sample No. 2) of a 100 part portion of the water wet, cooked, whole grain corn; 50 parts of a ground corn identical in all respects to that employed in preparing Sample No. 1; and 2 parts of a hydroxypropyl methylcellulose (Methocel ® K3) is also prepared.

As a control, a mixture (Sample No. C) having no grinding aid therein is prepared from 100 parts of the water wet, cooked, whole grain corn and 50 parts of the ground corn.

Each of the resulting mixtures is separately ground for 30 seconds on a hammer mill having 3 pivotally mounted hammers (impeller bars) operated at a speed of about 3600 rpm. The number average particle size of the ground corn in each sample and the percentage of the ground corn having a particle size greater than 2 mm are determined using conventional screening techniques. These results are recorded in Table I.

TABLE I

| Sample No. | Grinding Aid | | Particle size, mm (3) | Particles of Size >2 mm, % (4) |
|---|---|---|---|---|
| | Type (1) | Conc., % (2) | | |
| C* | — | — | 1.563 | 39.1 |
| 1 | K3 | 1 | 1.541 | 37.3 |
| 2 | K3 | 2 | 1.519 | 35.1 |

*Not an example of this invention.
(1) K3 = hydroxypropyl methylcellulose sold as Methocel ® K3 by the Dow Chemical Company.
(2) Concentration of the grinding aid expressed is the weight percent of the grinding aid based on the weight of the cooked, whole grain corn and the aqueous grinding medium.
(3) Particle size is the number average particle size of the corn (cooked, whole grain corn and dry, ground corn) following grinding.
(4) The weight percent of the total weight of corn (cooked, whole grain corn and dry, ground corn) having a particle size greater than 2 mm.

As evidenced by the data in Table I which shows that corn ground in the presence of a hydroxypropyl methylcellulose has a smaller number average particle size and that less of such ground corn has a particle size greater than 2 mm, the hydrophilic polysaccharide is shown to effectively increase the efficiency of the grinding of cereal grains.

EXAMPLE 2

Following the procedure of Example 1, several corn mixtures are ground in the presence of an aqueous grinding medium and the various amounts, as specified in Table II, of a hydroxypropyl methylcellulose sold as Methocel® K4M by The Dow Chemical Company (Sample Nos. 1 and 2). As a control, a mixture of corn is also ground by the method of Example 1 except no grinding aid is employed therewith (Sample No. C). The number average particle size and the percentage of each ground corn sample having a particle size greater than 2 mm is determined and the results recorded in Table II.

TABLE II

| Sample No. | Grinding Aid Type (1) | Grinding Aid Conc., % (2) | Particle Size, mm (3) | Particles of Size >2 mm, % (4) |
|---|---|---|---|---|
| C* | — | — | 1.316 | 31.6 |
| 1 | K4M | 0.5 | 1.297 | 29.0 |
| 2 | K4M | 0.8 | 1.296 | 28.0 |

*Not an example of this invention.
(1) K4M = hydroxypropyl methylcellulose sold as Methocel ® K4M by the Dow Chemical Company.
(2) Same as (2) in Table I.
(3) Same as (3) in Table I.
(4) Same as (4) in Table I.

As evidenced by the data in Table II, the corn ground in the presence of an aqueous grinding medium and a hydroxypropyl methylcellulose has a number average particle size less than the corn ground in the absence of a grinding aid. Moreover, less of the corn ground in the presence of the hydroxypropyl methylcellulose has a particle size greater than 2 mm. In this manner, the hydrophilic polysaccharide is shown to increase the grinding efficiency of the grinding of cereal grains. Similarly, corn ground in the presence of one and two weight percent of the hydroxypropyl methylcellulose based on the weight of whole grain corn and aqueous grinding medium is found to exhibit a smaller number average particle size and less of the ground corn is found to have a particle size greater than 2 mm, when such ground corn is compared to corn ground in the absence of a grinding aid.

EXAMPLE 3

In a manner similar to that of Example 1, a corn mixture is ground in the presence of an aqueous grinding medium and 1 weight percent, based on the weight of the aqueous grinding medium and whole grain corn, of a hydroxypropylated guar gum sold as Jaguar HP-11 by Jaguar, Inc. (Sample No. 1). As a control, a corn mixture is ground using similar techniques except employing no grinding aid (Sample No. C). The number average particle size and the percentage of particles having a particle size of greater than 2 mm of each ground corn sample is determined. These results are recorded in Table III.

TABLE III

| | Sample No. C* | Sample No. 1 |
|---|---|---|
| Polysaccharide | | |
| Type (1) | — | HP-11 |
| Conc. % (2) | — | 1 |
| Particle Size, mm (3) | 1.329 | 1.256 |
| Particles of Size >2 mm (4) | 31.0 | 29.2 |

*Not an example of this invention.
(1) HP-11 = hydroxypropylated guar gum sold as Jaguar HP-11 by Jaguar, Inc.
(2) Same as (2) in Table I.
(3) Same as (3) in Table I.
(4) Same as (4) in Table I.

The hydroxypropylated guar gum is shown to increase the grinding efficiency of the grinding of cereal grain as evidenced by the fact that the corn ground in the presence of the guar gum exhibits a smaller number average particle size and that less of such ground corn has a particle size greater than 2 mm when compared to corn ground using no grinding aid.

What is claimed is:

1. A method for grinding cereal grains said method comprising grinding the cereal grain in the presence of an aqueous grinding medium, said aqueous grinding medium being employed in amounts from about 10 to about 80 weight percent based on the weight of the cereal grain and aqueous grinding medium, and an amount of a hydrophilic polysaccharide sufficient to increase grinding efficiency.

2. The method of claim 1 wherein the hydrophilic polysaccharide is a cellulose ether, a natural gum or a modified starch.

3. The method of claim 1 wherein the hydrophilic polysaccharide is hydroxypropyl methylcellulose.

4. The method of claim 1 wherein the cereal grain is corn, the aqueous grinding medium is employed in an amount of from about 25 to about 60 weight percent based on the weight of the cereal grain, and the hydrophilic polysaccharide is methylcellulose or derivative thereof, said polysaccharide being employed in an amount from about 0.1 to about 10 weight percent based on the total weight of the cereal grain and aqueous grinding medium.

5. The method of claim 4 wherein the grinding is conducted using a rotary shear type mill.

6. The method of claim 5 wherein the hydrophilic polysaccharide is hydroxypropyl methylcellulose and is employed in an amount from about 0.2 to about 5 weight percent based on the total weight of the cereal grain and aqueous grinding medium and the grinding is conducted using a hammer mill.

7. The method of claim 1 wherein the hydrophilic polysaccharide is employed in an amount from about 0.1 to about 10 weight percent, based on the weight of the aqueous grinding medium and cereal grain.

* * * * *